(No Model.)
J. W. GURNSEY.
DRAFT EQUALIZER.
No. 539,582. Patented May 21, 1895.
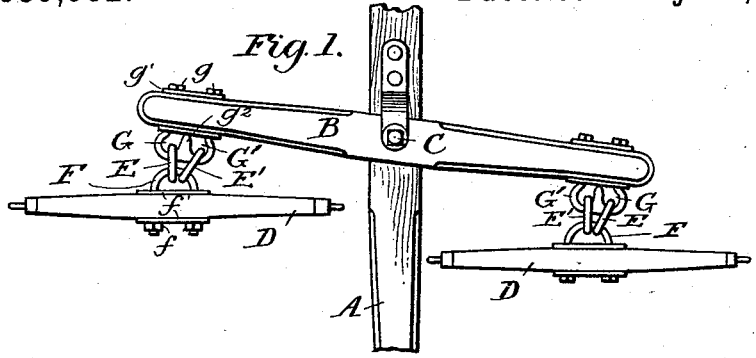
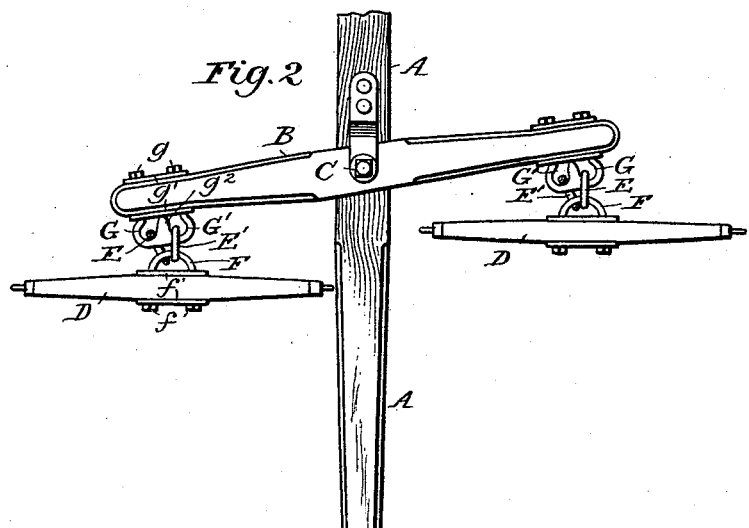
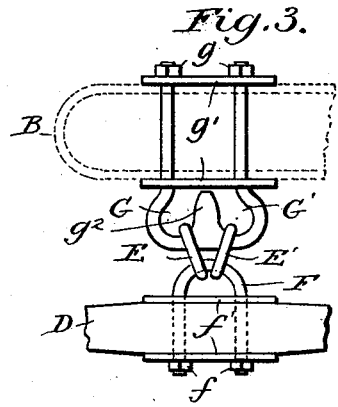
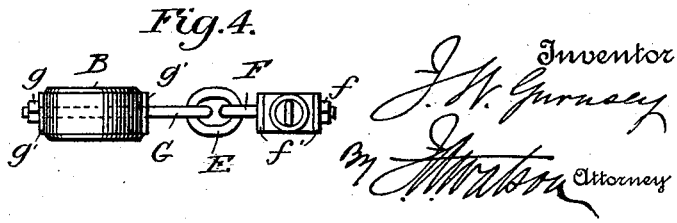
Witnesses
Jno G Hinkel
Will E. Neff
Inventor
J. W. Gurnsey
By _____ Attorney

UNITED STATES PATENT OFFICE.

JAMES W. GURNSEY, OF LIBERTY, PENNSYLVANIA, ASSIGNOR OF ONE-HALF TO Z. ELLIS KIMBLE, OF SAME PLACE.

DRAFT-EQUALIZER.

SPECIFICATION forming part of Letters Patent No. 539,582, dated May 21, 1895.

Application filed February 28, 1895. Serial No. 540,072. (No model.)

*To all whom it may concern:*

Be it known that I, JAMES W. GURNSEY, a citizen of the United States, residing at Liberty, in the county of Tioga and State of Pennsylvania, have invented certain new and useful Improvements in Draft-Equalizers, of which the following is a specification.

My invention relates to draft equalizers for vehicles, and other implements, and it has for its object to provide a simple, efficient and durable means for changing the leverage on the doubletree, so that when one horse gets ahead of the other the effective length of the arm of the doubletree on the side of the leading horse will be shortened, while that on the side of the lagging horse will be increased, thus enabling the latter horse to catch up with the former.

To these ends the invention consists in a certain novel construction and arrangement of devices which will be described in the following specification, reference being had to the accompanying drawings, in which—

Figures 1 and 2 are plan views of the doubletree and whiffletrees, showing the equalizing devices in different operative positions. Fig. 3 is an enlarged plan view of one of the equalizing devices, the doubletree and whiffletree being shown in dotted lines; and Fig. 4 is a side view of the devices shown in Fig. 3.

Referring to the drawings, A indicates the pole of a wagon or any other portion of a vehicle or agricultural implement to which a doubletree may be connected for draft purposes. The doubletree B is connected pivotally at its central point by a bolt C and the whiffletrees D are connected to the doubletree at equal distances from the center. As shown, each whiffletree is connected to the doubletree by a pair of links E, E', which links pass through a single eye or loop F on the whiffletree and separated eyes or loops G, G', on the doubletree.

In the form shown in the figures the loop F is U-shaped having its branches or shanks extending through the whiffletree and held therein by means of nuts $f$. On each side of the whiffletree there are preferably guard plates or washers $f'$ through which the staple passes. The loops G, G', are formed in a single piece having shanks passing through the doubletree and through plates $g'$, the shanks being provided with retaining nuts $g$. The two loops are separated by a dividing piece $g^2$ which is integral with the loops.

The operation of the invention will be evident from an inspection of Figs. 1, 2 and 3. When the horses are abreast of each other the strain will be transmitted equally through the links E, E', to the eyes G, G'. If, however, one horse gets in advance of the other, the draft of such horse will be transmitted through the inner link E' to the eye G' which is nearer to the fulcrum C of the doubletree, while the draft of the other horse will be transmitted through the outer link E to the eye G which is farther from the doubletree. It will thus be seen that the lagging horse will have the longer arm of the lever and will be enabled to catch up more readily than if the leverage were the same for both horses.

It will be evident that the several parts of my draft equalizer are readily separable and that with an ordinary wrench the single and double loops may be removed and new loops or new links substituted, if the original parts are worn or broken.

Having described the invention, what I claim is—

In a draft equalizer, a doubletree, provided at each end with a double loop G, G', having a dividing piece $g^2$, and two shanks passing through the doubletree, in combination with a pair of whiffletrees each provided with a single U-shaped loop having its arms or shanks passing through the whiffletree, and a pair of links connecting the single loop of each whiffletree with the corresponding double loop of the doubletree, said links being adjacent in the single loop, and separated in the double loop by the part $g^2$, substantially as and for the purpose described.

In testimony whereof I affix my signature in presence of two witnesses.

JAMES W. GURNSEY.

Witnesses:
GRANT SEBRING,
B. F. WERLINE.